R. E. HUMBERT.
HEATING ELEMENT.
APPLICATION FILED JUNE 19, 1912.
1,098,351.
Patented May 26, 1914.
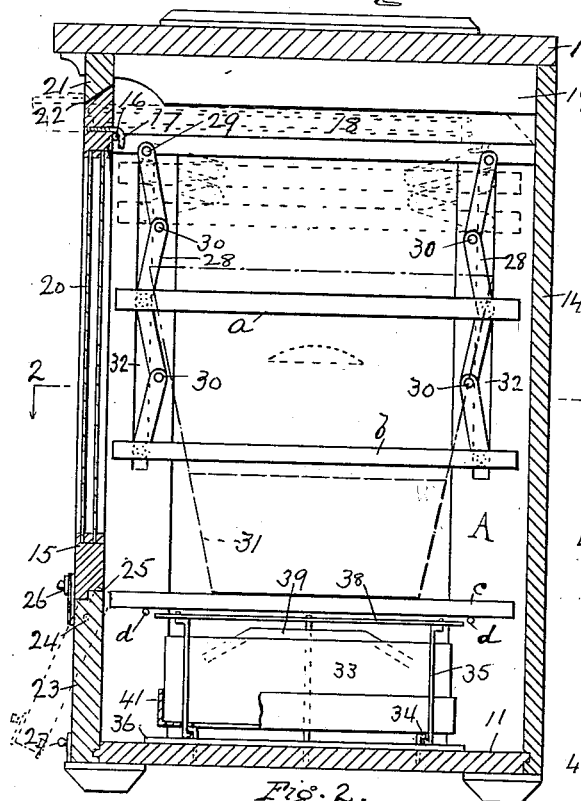
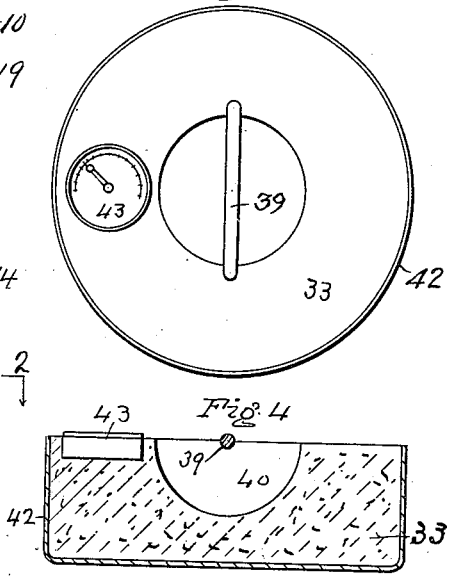
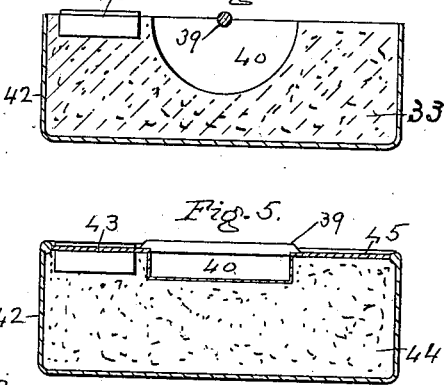
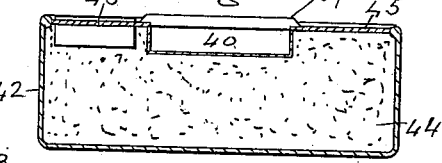
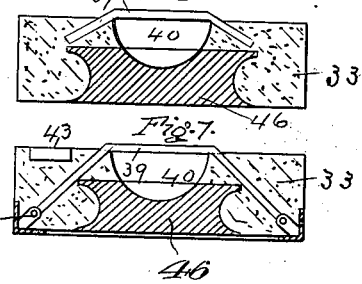
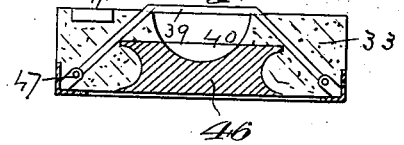
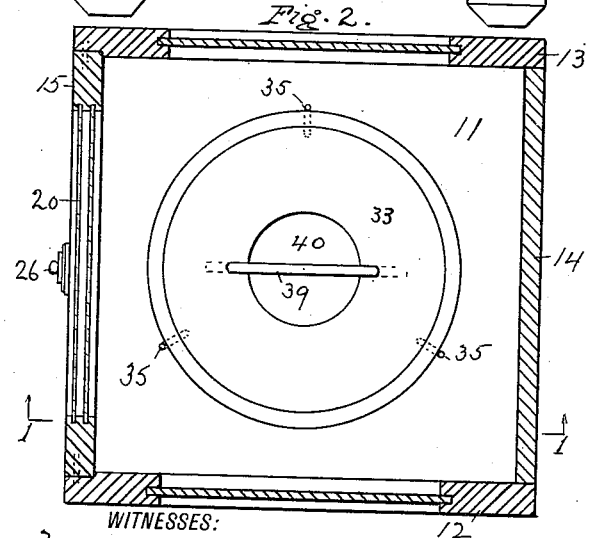
WITNESSES:
INVENTOR
Richard E. Humbert
BY
his ATTORNEYS
COLUMBIA PLANOGRAPH CO., WASHINGTON, D. C.

UNITED STATES PATENT OFFICE.

RICHARD E. HUMBERT, OF MILFORD, PENNSYLVANIA.

HEATING ELEMENT.

1,098,351. Specification of Letters Patent. Patented May 26, 1914.

Application filed June 19, 1912. Serial No. 704,615.

*To all whom it may concern:*

Be it known that I, RICHARD E. HUMBERT, a citizen of the United States of America, and residing at Milford, in the county of Pike and State of Pennsylvania, have invented a certain new and Improved Heating Element, of which the following is a specification.

My invention relates to heating elements and particularly for dough raising cabinets for domestic or household use, the object of my invention being to provide a heating element of rugged and efficient construction possessing the features of novelty hereinafter described and illustrated in the accompanying drawing, in which—

Figure 1 is a vertical section through a dough raising cabinet showing my improved heating element in position; Fig. 2 is a horizontal section on the line 2—2, Fig. 1; Fig. 3 is a plan of the heating unit; Fig. 4 a vertical section thereof; and Figs. 5, 6 and 7 are similar views of modified forms.

The heating element which forms the subject of the present invention is particularly designed for use in dough raising cabinets such as shown in Fig. 1. In such a cabinet A the inclosing walls 10, 11, 12, 13, 14 are so joined as to render it substantially air tight during use. A door 15, hung at the top on dowel pins 16 by means of open faced hooks 17, may be swung up and pushed back in the guide ways 18 plowed out of the side top frames 19. A glass panel 20 is preferably inserted in the door to permit vision into the interior. To insure a tight joint between the top of the door and the top cross frame 21, the meeting faces are cut on a 45° bevel as indicated at 22.

The front base panel 23 is hinged on dowels at 24 so that it may be swung up to permit flour, crumbs, etc., to be readily brushed out of the bottom of the cabinet. The upper edge of this panel is rabbeted to form a joint at 25 with the lower edge of the door which is rabbeted in like manner. A latch 26 holds the door closed, while a combined slide pin and lifting knob 27 affords means for securing the panel 23 in its normal position.

The chamber contains as usual a series of shelves, *a, b, c*, which may be supported in any convenient manner. I have here shown the bottom shelf *c* supported on pins *d* projecting from the sides 12 and 13 at a suitable height from the base 11. The upper shelves *a, b*, are preferably supported upon collapsible link frames 28—28 hung from pins 29—29, at the top. The pivoting rivets 30 by which the links are jointed together, may be made sufficiently tight to frictionally suspend the shelves (which are quite light) when the latter are raised to the position shown in dotted lines. In this position the chamber is designed to accommodate a mixing pan or pail 31 of any well known type. Guide-ways 32 for the buttons by which the shelves are carried on the collapsible frame, may be formed in any suitable manner on or in the sides 12 and 13.

My improved heating element is supported on the bottom 11 of the cabinet. This element preferably comprises a block 33 of refractory material supported on the shoulders 34 of specially formed screw staples 35 and separated from the wood of the bottom by an asbestos disk 36. The upper ends of the staples are again offset to form shoulders 37 upon which rests a second asbestos disk 38. These disks not only serve to protect the woodwork against excessive heat, but being absorbent afford a suitable vehicle for moisture which is a desirable property for the air to possess in order to prevent the formation of a crust upon the dough while rising.

The refractory heating element may be variously formed. I prefer to make the block of cement or concrete, embedding in the upper face the ends of a heavy wire 39 which forms a handle. The recess 40 beneath the wire affords room for the fingers. A reinforcing angle iron ring 41 may be placed around the bottom edge of the block, as shown in Fig. 1, to strengthen the same and to protect it from shock. If desired the reinforcement may be carried up so as to form a complete receptacle 42 for the block, as shown in Fig. 4. Preferably a heat register 43 is embedded in the upper face of the block so that it may be ascertained with substantial accuracy that the stone has been brought to the desired temperature for use in the cabinet. When a reinforcing receptacle 42 is used, the refractory body of the heating element may be composed of sand 44; in which case a disk cover 45, carrying the register 43 is preferably used, being secured in position by rolling over the edges of the receptacle 42. In any of the forms shown a metal core 46 may be inserted which takes up heat more rapidly than the refractory material. Inasmuch however, as the core is embedded in refractory material, and, in position for use, rests upon the refractory asbestos pad 36, its heat is retained and is given off but slowly. Similarly in any of the forms shown, the handle wire may be carried down and fastened to lugs 47 on the reinforcing ring or receptacle. The lugs thus serve not only as studding to unite the reinforcing ring to the cement, but also as suspension ears, by which the strain incident to the lifting of the block is transmitted to the metal ring.

I am aware that I am not the first to place a heating element in a dough raising cabinet. But so far as I am aware, prior heating elements have been of different construction from the present. I am also aware that various devices have been proposed as plate or pot warmers for table use or the like. These have been for the most part of metallic construction, resembling stove lids or the like, as in the Jarvis Patent 213,904; while where refractory substances have been employed, they are not of a construction well adapted to be placed in the limited space available in the bottom of a dough raiser. Examples of these types are found in Boeck 804,184 and Rich 738,573. In the latter a refractory body is inclosed in a metallic casing, the upper face of which is anchored in the cement by a light perforated ring, through the perforations in which the cement passes, while plastic. Such a ring could have no practical effect as a heat absorbing and radiating core such as is shown and claimed by me, and I do not pretend that my invention includes such a structure as Rich's or the patents above noted disclose.

Various other modifications of my improved heating unit will readily suggest themselves.

I claim as my invention:—

1. A heating element of the character described, comprising a portable block of refractory material such as cement or sand and a metallic core embedded in said refractory material and exposed at the lower face of the block whereby heat may be quickly taken up by said core, in combination with means whereby said block may be readily carried, substantially as described.

2. A heating element of the character described, comprising a portable block of refractory material such as cement or sand, a metallic handle substantially flush with and embedded in the upper face thereof, the body of the block being recessed below said handle to afford finger room, together with a solid metallic core centrally embedded in said refractory material, substantially as described.

3. A heating element of the character described, comprising a portable block of refractory material such as cement or sand, a metallic handle substantially flush with and embedded in the upper face thereof, the body of the block being recessed below said handle to afford finger room, together with a solid metallic core centrally embedded in said refractory material, and a peripheral metallic reinforcing ring for the refractory block, substantially as described.

In testimony whereof I have signed my name to this specification, in the presence of two subscribing witnesses.

RICHARD E. HUMBERT.

Witnesses:
 MABEL PAGE HUMBERT,
 J. C. CHAMBERLAIN.

---

Copies of this patent may be obtained for five cents each, by addressing the "Commissioner of Patents, Washington, D. C."